(12) United States Patent
Ikeda et al.

(10) Patent No.: US 7,016,099 B2
(45) Date of Patent: Mar. 21, 2006

(54) MEMS ELEMENT, GLV DEVICE, AND LASER DISPLAY

(75) Inventors: Koichi Ikeda, Kanagawa (JP); Takashi Shimada, Kanagawa (JP)

(73) Assignee: Sony Corporation, (JP)

( * ) Notice: Subject to any disclaimer, the term of this patent is extended or adjusted under 35 U.S.C. 154(b) by 386 days.

(21) Appl. No.: 10/189,416

(22) Filed: Jul. 8, 2002

(65) Prior Publication Data

US 2004/0004592 A1    Jan. 8, 2004

(30) Foreign Application Priority Data

Jul. 6, 2001    (JP)    ............................ P2001-206452

(51) Int. Cl.
   *G02B 26/00*   (2006.01)
(52) U.S. Cl. ....................... 359/291; 359/302; 359/290
(58) Field of Classification Search ............ 359/298–9, 359/290–2, 295, 302, 315–6, 318, 254, 247, 359/259, 263, 291
See application file for complete search history.

(56) References Cited

U.S. PATENT DOCUMENTS

| 6,437,925 | B1 * | 8/2002 | Nishioka | .................... 359/726 |
| 2002/0070931 | A1 * | 6/2002 | Ishikawa | .................... 345/204 |
| 2002/0181110 | A1 * | 12/2002 | Bower et al. | ................ 359/599 |
| 2004/0141224 | A1 * | 7/2004 | Huibers | .................... 359/291 |

* cited by examiner

*Primary Examiner*—Jordan Schwartz
*Assistant Examiner*—Jessica Stultz
(74) *Attorney, Agent, or Firm*—Rader, Fishman & Grauer PLLC; Ronald P. Kananen (57) ABSTRACT

A MEMS element is constituted as a light modulation element for constituting a GLV device, and it has the same constitution as a conventional MEMS element except for differing in the structure of a bridge member of a membrane. The membrane comprises SiN film of, for example, 100 nm in thickness laminated thereon, and a combined light reflective film and membrane-side electrode composed of an Al film of 100 nm in thickness provided on the bridge member. The $SiO_2$ film may be a $SiO_2$ film formed by thermal oxidation of a sacrificing layer formed of polysilicon or may be a $SiO_2$ film formed by a CVD method or a PVD method.

4 Claims, 8 Drawing Sheets

MEMS ELEMENT, GLV DEVICE, AND LASER DISPLAY

BACKGROUND OF THE INVENTION

The present invention relates to an MEMS element, a GLV device, and a laser display. More particularly, the invention relates to an MEMS element having such a structure as not to be susceptible to damage at the time of removing a sacrificing layer, particularly an MEMS element having a high light reflectance optimum as a light modulation element, a GLV device comprising the MEMS elements, and a laser display comprising the GLV device.

Attendant on the progress of microtechnology, attention has been paid to the so-called micromachine (MEMS: Micro Electro-Mechanical System) element (hereinafter referred to as MEMS element).

The MEMS element is formed as a microstructure on a substrate, such as a silicon substrate, a glass substrate, and the like, in which a driver for outputting a mechanical driving force and a semiconductor integrated circuit or the like for controlling the driving of the driver are coupled electrically and mechanically. A basic characteristic of the MEMS element lies in that the driver constituted as a mechanical structure is incorporated in a part of the element, and the driving output of the driver is generally performed electrically by application of a coulomb force between electrodes.

As an example of the MEMS element, a light modulation element used in a GLV (Grating Light Valve) device developed as a light intensity conversion element for laser display, namely, as a light modulator, by the SLM (Silicon Light Machine) Company is mentioned, and its structure will be described.

Figure 5:
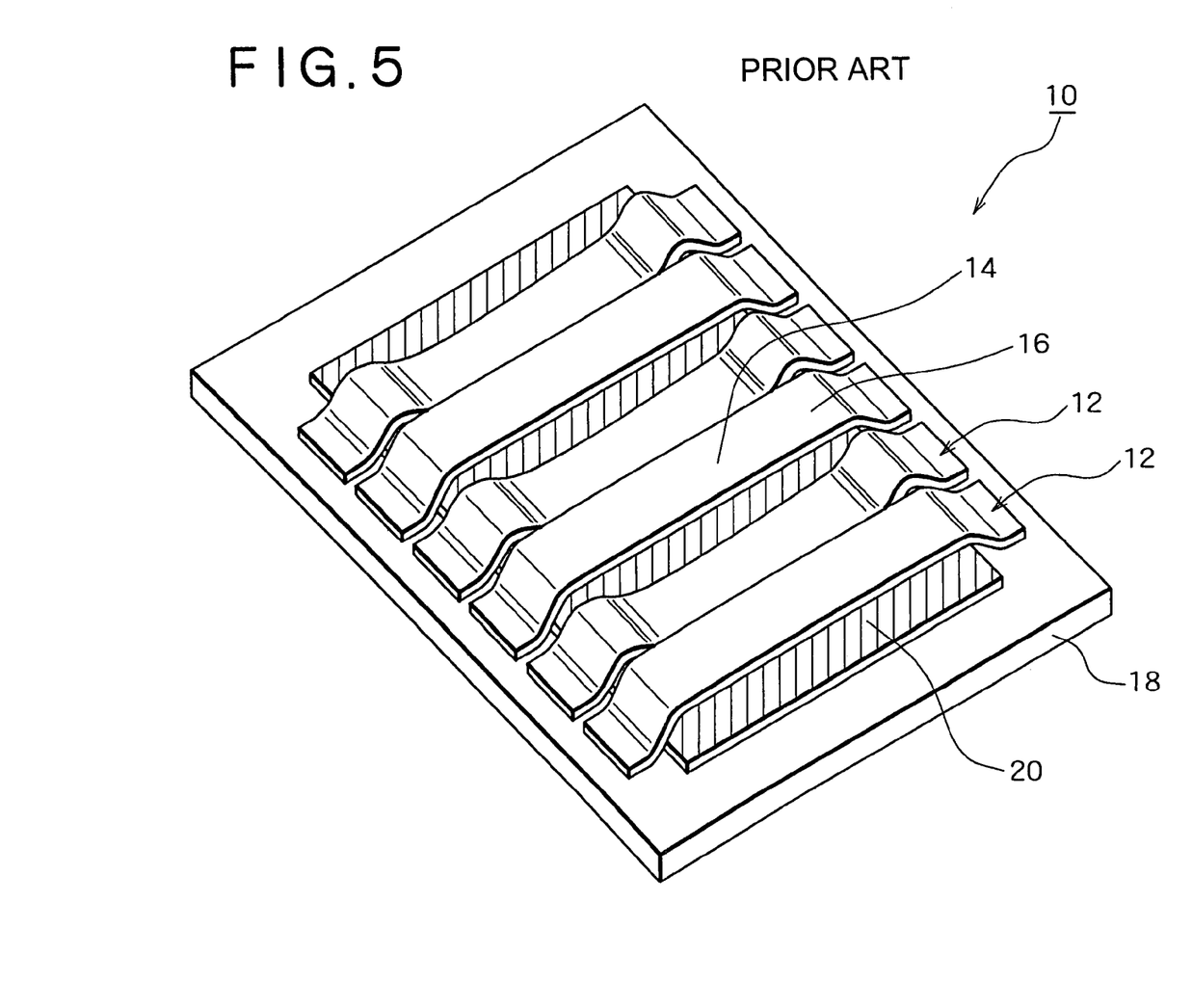
FIG. 5 is a perspective view of a GLV device.

First, referring to FIG. 5, the structure of the GLV device comprised of the MEMS elements will be described. FIG. 5 is a perspective view showing the constitution of the GLV device.

As shown in FIG. 5, the GLV device 10 is a device in which a plurality of MEMS elements 12 are disposed on a common substrate densely and in parallel to each other.

Each of the MEMS elements 12 constituting the GLV device is an MEMS element called MOEMS (Micro Optical Electro-Mechanical Systems) comprising an electrostatic driving type membrane 16 having a light reflective surface 14 on the upper side thereof and has the function of modulating the intensity of the reflected light by regulating the distance between the light reflective surface 14 and the substrate 18 through mechanical movements of the membrane 16 by an electrostatic attracting force or an electrostatic repulsion force.

Figure 6:
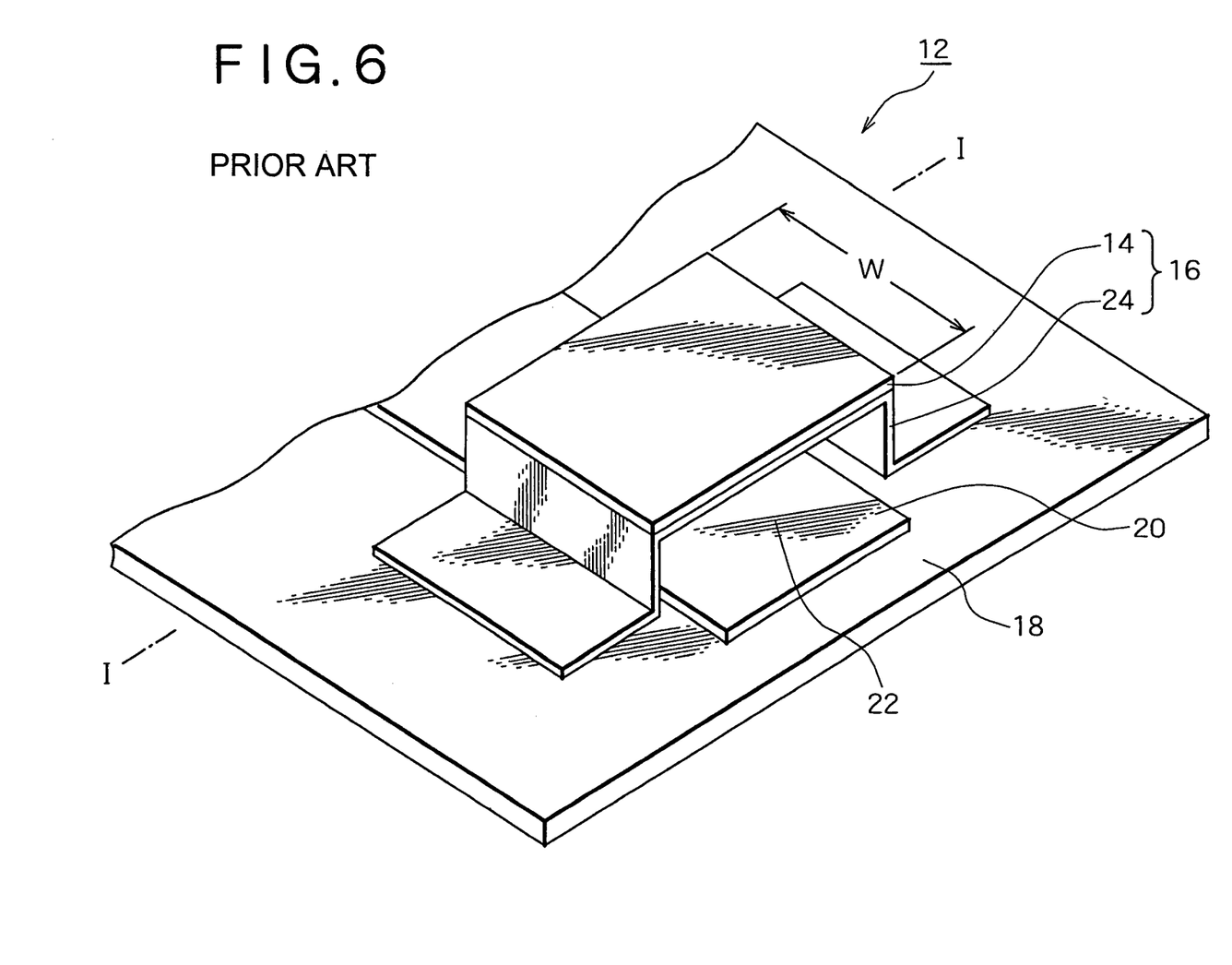
FIG. 6 is a perspective view of a MOEMS.

Next, referring to FIG. 6, the constitution of the MOEMS 12 will be described. FIG. 6 is a perspective view showing the constitution of the MOEMS.

As shown in FIG. 6, the MOEMS 12 comprises an insulating substrate 18, such as a glass substrate, a substrate-side electrode 20 comprised of a thin Cr film or the like and formed on the insulating substrate 18, and the electrostatic driving type membrane 16 crossing and striding the substrate-side electrode 20 in a bridge form.

The electrostatic driving type membrane 16 and the substrate-side electrode 20 are electrically isolated from each other by a void portion 22 therebetween.

The electrostatic driving type membrane 16 comprises a bridge member 24 composed of an SiN film provided as an electrode support member and based on the substrate 18 bridgingly astride the substrate-side electrode 20 and a combined light reflective film and membrane-side electrode 14 composed of an Al film with a thickness of about 100 nm and provided on the bridge member 24 opposed to and in parallel to the substrate-side electrode 20.

The bridge member 24 is opposed to and spaced by a predetermined distance from the substrate-side electrode 20 so as to secure the void portion 22 therebetween, and it is provided for supporting the combined light reflective film and membrane-side electrode 14 in parallel to the substrate-side electrode 20.

In the GLV device 10, the insulating substrate 18 and the substrate-side electrode 20 thereon are respectively a common substrate and a common electrode for the MOEMS 12, as shown in FIG. 5.

The electrostatic driving type membrane 16 constituted of the bridge member 24 and the combined light reflective film and membrane-side electrode 14 thereon is a portion called a ribbon. The bridge member 24 may in some cases be of the cantilever type in which only one end of a beam portion is supported by one column portion, in place of the bridge form shown in FIG. 6 in which both ends of a beam portion extending in parallel to the substrate-side electrode 20 are supported by two column portions, respectively.

The aluminum film (Al film) used as the combined light reflective film and membrane-side electrode 14 is a metallic film preferable as an optical component material on the grounds that (1) it is a metallic film which can be formed comparatively easily, (2) it has a small wavelength dispersion of light reflectance in the visible ray region, (3) a spontaneously oxidized alumina film formed on the surface of the Al film functions as a protective film for protecting the reflective surface, and the like.

On the other hand, the SiN film (silicon nitride film) constituting the bridge member 24 is selected on the ground that its physical properties, such as strength and elastic constant, are suitable for mechanical driving of the bridge member 24.

When a minute voltage is impressed between the substrate-side electrode 20 and the combined light reflective film and membrane-side electrode 14 opposed to the substrate-side electrode 20, the electrostatic driving type membrane 16 approaches the substrate-side electrode 20 due to an electrostatic phenomenon, and when the impressing of the voltage is stopped, the electrostatic driving type membrane 16 is spaced away from the substrate-side electrode 20 into its original state.

The MOEMS 12 constituting the GLV device 10 each functions as a light modulation element for modulating the intensity of reflected light by changing the inclination of the combined light reflective film and membrane-side electrode 14 through the approaching and spacing of the electrostatic driving type membrane 16 relative to the substrate-side electrode 20.

The dynamic characteristics of the membrane 16 driven by utilizing the electrostatic attracting force and the electrostatic repulsion force are substantially determined by the physical properties of the SiN film formed by the CVD method or the like, and the Al film plays a main role as a reflection mirror.

The void structure necessary for the membrane 16 to function as the driver is formed by a process in which a sacrificing layer to be finally removed is formed between the SiN film constituting the bridge member 24 and the substrate-side electrode 20 on the lower side, and, after the formation of the membrane 16, only the sacrificing layer is selectively removed.

Next, referring to FIG. 7, a method of fabricating the MOEMS 12 will be described. FIGS. 7A to 7E are sectional views taken along line I—I of FIG. 6 according to the steps of fabrication of the MOEMS 12.

Figure 7A:
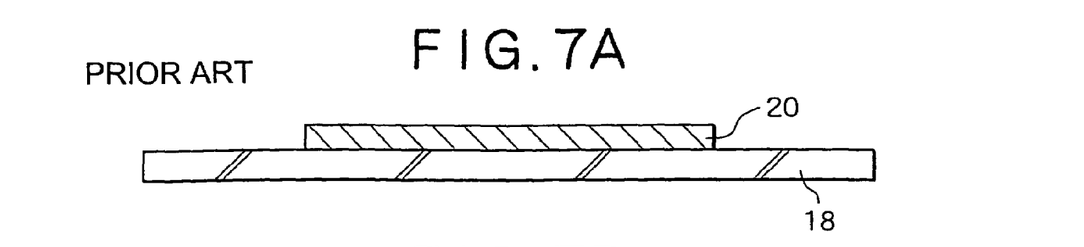
FIGS. 7A to 7E are sectional views taken along line I—I of FIG. 6, according to the sequence of steps for fabricating the MOEMS.

As shown in FIG. 7A, a metallic film, such as a W (tungsten) film, is formed on the substrate 18, and it is patterned to form the substrate-side electrode 20.

Figure 7B:
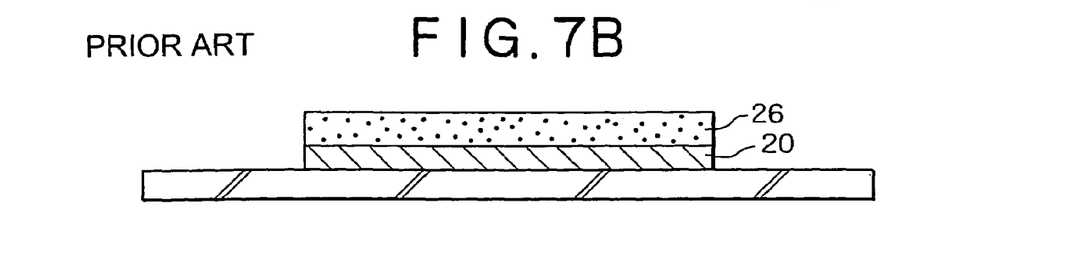

Next, as shown in FIG. 7B, an amorphous silicon film or a polysilicon film is formed on the entire surface of the substrate 18, and it is patterned to form the sacrificing layer 26 on the substrate-side electrode 20.

The sacrificing layer 26 functions as a support layer for forming the bridge member 20 next and is finally removed, as will be described later. Therefore, the sacrificing layer 26 is formed of an amorphous silicon film, a polysilicon film or the like which has a high etching selectivity ratio relative to an oxide film, a nitride film, and a metallic film for constituting the substrate-side electrode 20 and the bridge electrode portion 16.

Figure 7C:
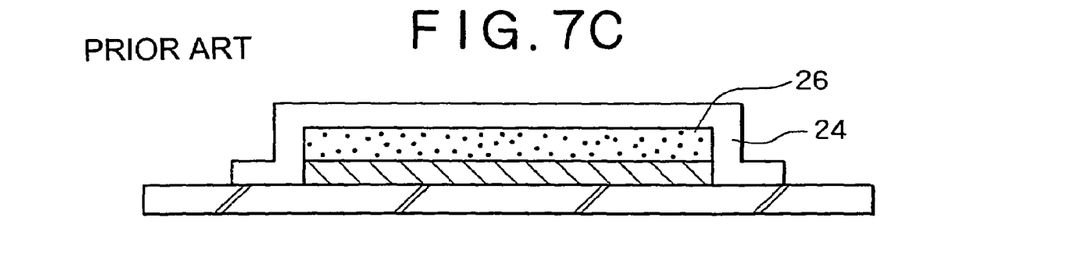

Subsequently, a SiN film is formed on the entire surface of the substrate 18, and it is patterned to form the bridge member 24 that is based on the substrate 18 and is astride and in contact with the sacrificing layer 26, as shown in FIG. 7C.

Figure 7D:
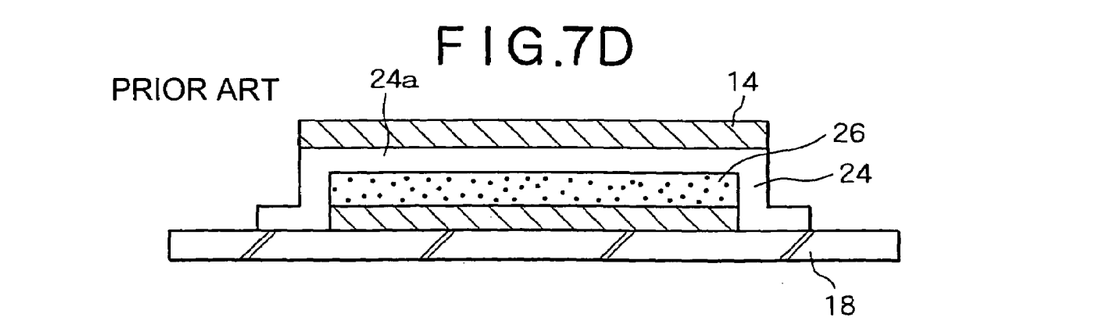

Next, as shown in FIG. 7D, a membrane-side electrode film consisting of an Al film is formed on the entire surface of the substrate 18 inclusive of the substrate-side electrode facing portion 24a of the bridge member 24, and it is patterned to form the membrane-side electrode 14 on the substrate-side electrode facing portion 24a of the bridge member 24.

Figure 7E:
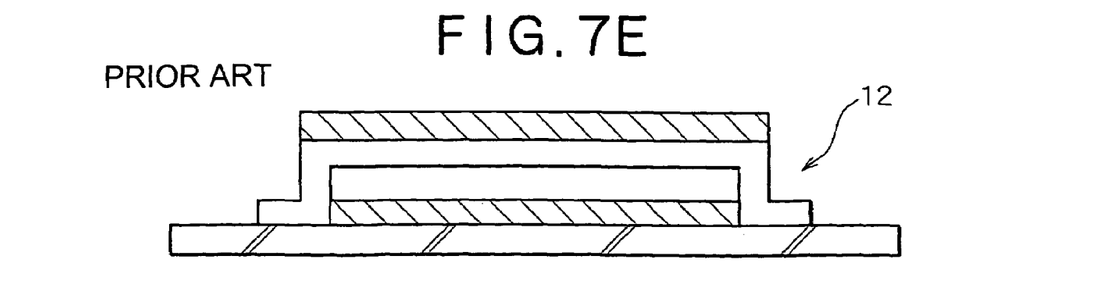

Next, the sacrificing layer 26 composed of the amorphous silicon film or the polysilicon film is removed by dry etching using $XeF_2$ gas to complete the MOEMS 12, as shown in FIG. 7E.

Thus, in the fabrication of the MEMS elements, microstructures are formed on a silicon substrate or a glass substrate by application of a surface micro-machining technology based on the fabrication process of a semiconductor integrated circuit for forming a thin film structure on a silicon substrate.

In order to fabricate the above-described microstructures utilizing the elasticity of beams or the like, it is necessary to form the void layers under the beams. Therefore, as described above, the sacrificing layer is preliminarily provided, then other layers for constituting the beam portions are formed on the sacrificing layer, and the sacrificing layer is removed by etching, whereby the void layers are provided and the beam portions are formed.

According to the method of fabricating the MOEMS described above, at the time of removing the sacrificing layer 26 composed of silicon, such as polysilicon and amorphous silicon, $XeF_2$ gas showing a high etching rate ratio between silicon and a material other than silicon is used as an etching gas.

Besides, the sacrificing layer composed of silicon also can be etched away by plasma etching using $SF_6$, $NF_3$ or the like as a reactant gas.

In the etching using $XeF_2$ and in the plasma etching using $SF_6$, $NF_3$ or the like as a reactant gas, the etching selectivity ratio between SiN constituting the membrane and silicon constituting the sacrificing layer is not less than 100, and, in the case of fabricating a single MOEMS, the sacrificing layer composed of silicon can be removed, particularly without damaging the SiN film.

Figure 8A:
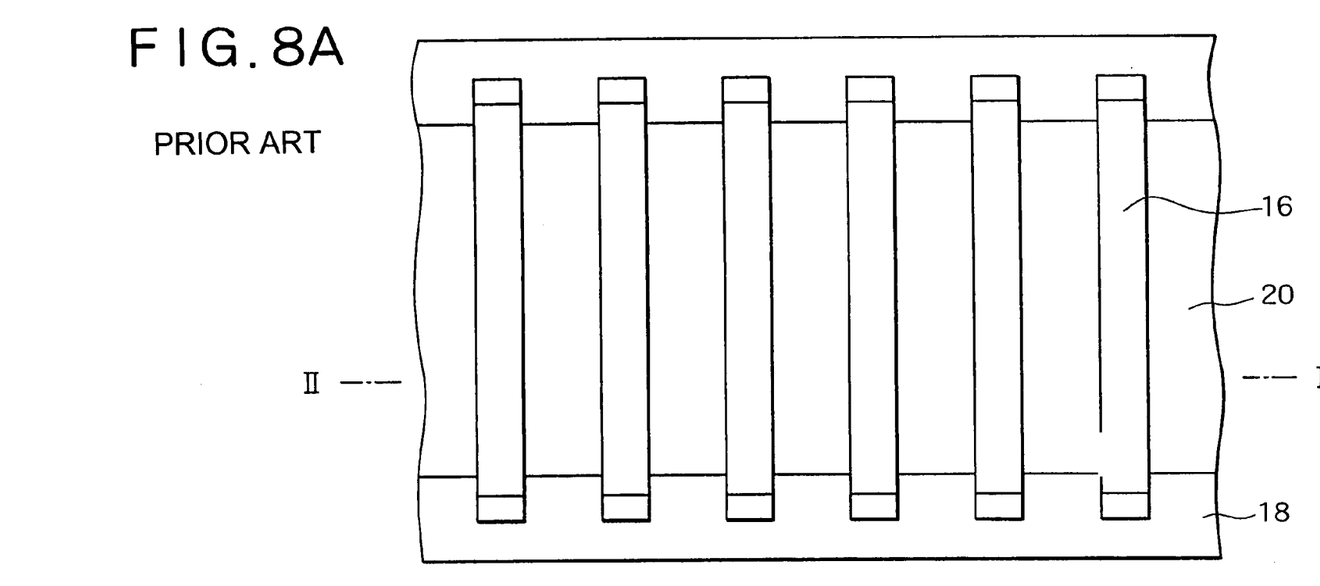
FIGS. 8A and 8B are respectively a plan view showing the layout of the MOEMS and a sectional view of the MOEMS taken along line II—II of FIG. 8A.
Figure 8B:
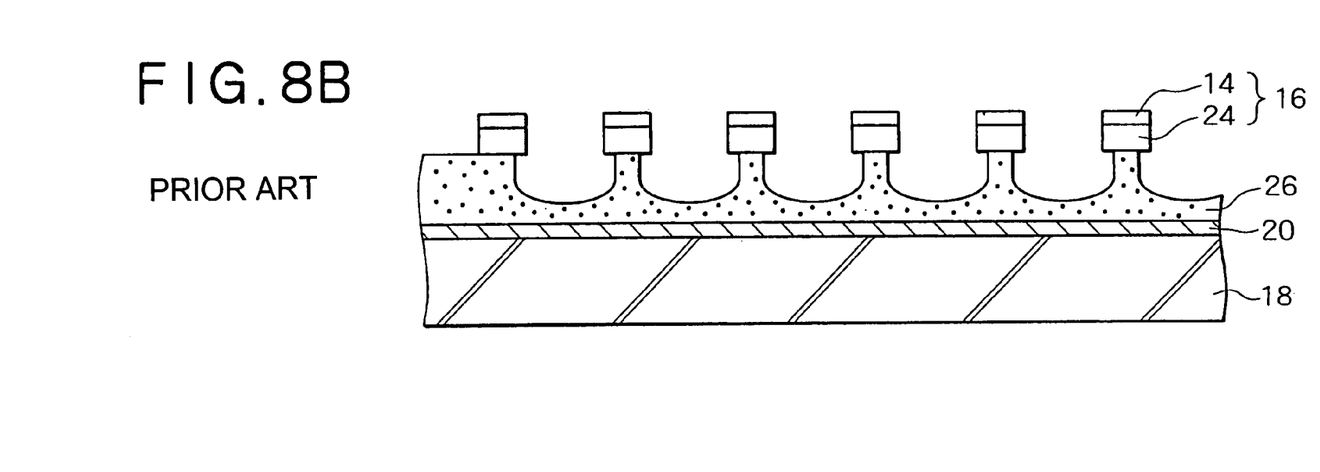

In the case of fabricating such a device as the above-mentioned GLV device 10 comprising a multiplicity of MOEMS 12 disposed densely and in parallel to each other, as shown in FIG. 8A, however, an attempt to etch away the sacrificing layer 26 by feeding the etching gas through the gaps between the membranes 16 results in the etching rate, namely, the progress of etching, is non-uniform between the portions under the membranes 16 and the portions between the membranes 16, as shown in FIG. 8B, and the sacrificing layer 26 cannot be etched uniformly. As shown in FIG. 8B, particularly, the etching of the portions directly under the membranes 16 is retarded. FIGS. 8A and 8B are respectively a plan view showing the layout of the MOEMS 12 and a sectional view of the MOEMS 12 taken along line II—II of FIG. 8A.

An attempt to completely etch away the sacrificing layer 26 in the regions where the etching rate is low leads to the SiN film that is exposed in the regions where the etching rate is high is damaged, resulting in a distribution generated in the film thickness of the membranes.

When a distribution is generated in the film thickness of the membranes, the smoothness of the membranes after completing the void structures is worsened, the light reflectance is lowered, and the light utilization efficiency of the MOEMS is worsened. Further, the movements by electrostatic driving of the membranes are dispersed, and, therefore, predetermined light modulation characteristics are not displayed. Furthermore, the mechanical strength of the membranes is dispersed, and, therefore, the useful life of the MOEMS and, hence, the useful life of the GLV device are shortened.

Accordingly, it has been desired to develop an MEMS element comprising a membrane with such a structure that it is not damaged at the time of etching away a sacrificing layer.

SUMMARY OF THE INVENTION

It is an object of the present invention to provide an MEMS element comprising a membrane having such a constitution as not to be damaged at the time of removing a sacrificing layer by etching in using silicon, such as polysilicon and amorphous silicon, for constituting the sacrificing layer, a GLV device comprised of such MEMS elements, and a laser display comprising such a GLV device.

The present inventors had considered that in the dry etching using $XeF_2$ gas or the like, an etching selectivity ratio of not less than 100 is present between the silicon film and the SiN film and the etching selectivity ratio is sufficiently high. However, it was found that the SiN film is damaged due to the low etching selectivity ratio, as described above.

Accordingly, the present inventors considered that, in order to obtain membranes that are not damaged at the time of etching away the sacrificing layer composed of silicon, it is necessary to form the membranes of a material having a high etching selectivity ratio relative to silicon.

In view of the above, the present inventors have tested various materials and, as a result, have found out that a silicon oxide ($SiO_2$) film formed by a CVD method or a PVD method and an $SiO_2$ film formed by thermal oxidation of a silicon film show an extremely high etching selectivity ratio relative to polysilicon and amorphous silicon.

According to the experiments conducted by the present inventors, it was found out that Si, SiN and $SiO_2$ are etched at etching rate ratios of 1000:1:0.1 when $XeF_2$ gas is used as the etching gas. It also was found out that such metal oxide films as a titanium oxide ($TiO_2$) film and a zirconium oxide ($ZrO_2$) film also have the same effect as that of the $SiO_2$ film.

Taking into account the fact that the SiN film constituting the membranes in the prior art is selected because its physical properties, such as strength and elastic constant, are suitable for mechanical driving of the bridge members, the present inventors got the idea of constituting the membranes of a laminate structure of an SiN film and an $SiO_2$ film. Based on the idea, the present inventors have conducted experiments. As a result of the experiments, it has been confirmed that the laminate structure of the SiN film and the $SiO_2$ film has a high etching selectivity ratio, as desired, and shows appropriate strength and elastic constant for use as a driver, and the present invention has been completed.

In accordance with one aspect of the present invention, there is provided an MEMS element comprising:
a substrate-side electrode provided on an insulating substrate, and
a membrane comprising a bridge member extending above and spaced from the substrate-side electrode in the manner of crossing the substrate-side electrode, and a membrane-side electrode provided on the bridge member oppositely to the substrate-side electrode, the membrane constituting a driver for driving by an electrostatic attracting force or an electrostatic repulsion force acting between the membrane-side electrode and the substrate-side electrode,
wherein the bridge member has a multilayer structure comprising at least two layers including any of a silicon oxide ($SiO_2$) film, a titanium oxide ($TiO_2$) film and a zirconium oxide ($ZrO_2$) film, and an SiN film, and provided oppositely to said substrate-side electrode.

The bridge member according to the present invention does not necessarily have the two-layer structure of the $SiO_2$ film and the SiN film. In order to facilitate the control of the elastic force of the bridge member, the bridge member may have a three-layer structure in which another layer, for example, an $SiO_2$ film, is intermediately provided between the metallic film constituting the membrane-side electrode and the SiN film. With the $SiO_2$ film provided intermediately between an Al film and the SiN film, the adhesive force between the SiN film and the Al film is enhanced, and, further, the generation of electrical problems, such as generation of an interface state, can be restrained.

In the MEMS element according to the present invention, preferably, the membrane-side electrode is provided as a combined light reflective film and electrode composed of a metallic film having the function as a light reflective film, and the MEMS element functions as a light modulation element for modulating the intensity of reflected light by driving the light reflective film through an electrostatic attracting force or an electrostatic repulsion force acting between the membrane-side electrode and the substrate-side electrode.

There is no limitation as to the method of supporting the membrane; and the bridge member is based on the substrate in the form of a bridge supported at both ends thereof or in the form of a cantilever supported at one end thereof.

In accordance with another aspect of the present invention, there is provided s GLV device comprising a plurality of MEMS elements constituted respectively as light modulation elements and disposed in parallel to each other, wherein
each of the MEMS elements comprises:
a substrate-side electrode provided on an insulating substrate, and
a membrane comprising a bridge member extending above and spaced from the substrate-side electrode in the manner of crossing the substrate-side electrode, the bridge member being provided oppositely to the substrate-side electrode and having a multilayer structure comprising at least two layers including any of a silicon oxide ($SiO_2$) film, a titanium oxide ($TiO_2$) film and a zirconium oxide ($ZrO_2$) film, and an SiN film, and a membrane-side electrode composed of a metallic film having the function as a light reflective film and provided as a combined light reflective film and electrode on the bridge member oppositely to the substrate-side electrode, wherein
the membrane-side electrodes are independent from each other and disposed in parallel to each other, while the substrate-side electrode is provided as a common electrode, and
each of the MEMS elements functions as a light modulation element for modulating the intensity of reflected light by driving the light reflective film through an electrostatic attracting force or an electrostatic repulsion force acting between the membrane-side electrode and the substrate-side electrode.

In accordance with a further aspect of the present invention, there is provided a laser display comprising a laser and a GLV device disposed on the optical axis of laser light emitted from the laser to modulate the intensity of the laser light, wherein
the GLV device comprises a plurality of MEMS elements constituted respectively as light modulation elements and disposed in parallel to each other,
each of the MEMS elements comprises:
a substrate-side electrode provided on an insulating substrate, and
a membrane comprising a bridge member extending above and spaced from the substrate-side electrode in the manner of crossing the substrate-side electrode, the bridge member being provided oppositely to the substrate-side electrode and having a mutilayer structure comprising at least two layers including any of a silicon oxide ($SiO_2$) film, a titanium oxide ($TiO_2$) film and a zirconium oxide ($ZrO_2$) film, and an SiN film, and a membrane-side electrode composed of a metallic film having the function as a reflective film and provided as a combined reflective film and electrode on the bridge member oppositely to the substrate-side electrode, wherein
the membrane-side electrodes are independent from each other and disposed in parallel to each other, while the substrate-side electrode is provided as a common electrode, and
each of the MEMS elements has the function as a light modulation element for modulating the intensity of reflected light by driving the reflective film through an electrostatic attracting force or an electrostatic repulsion force acting between the membrane-side electrode and the substrate-side electrode.

In the laser display according to the present invention, there is no limitation as to the number of lasers; the laser display may be a monochromic laser display or a full-color display.

In the case of the full-color display, the laser display comprises: a red laser, a green laser, and a blue laser; a color combination filter for combining red laser light, green laser light and blue laser light emitted respectively from the red laser, the green laser and the blue laser; and GLV devices disposed on optical axes between the red laser, the green laser and the blue laser, and the color combination filter, for modulating the intensities of the red laser light, the green laser light and the blue laser light emitted respectively from the red laser, the green laser and the blue laser.

According to the present invention, by providing the bridge member with a multilayer structure comprising at least two layers including a metal oxide film, such as a silicon oxide film, oppositely to the substrate-side electrode and providing a membrane-side electrode thereon, the film thickness distribution of the membranes due to the etching from the back side of the membranes can be restrained at a minimum at the time of removing the silicon-based sacrificing layer in the fabrication of the MEMS elements.

By using the MEMS element according to the present invention as a light modulation element, it is possible to enhance light reflectance, enhance light utilization efficiency, enhance the strength of the driver, and enhance the uniformity of driving. By this, in addition, it is possible to enhance the reliability of the MEMS elements and to enlarge the production margins in the fabrication process.

Further, by composing the GLV device of the MEMS elements according to the present invention, it is possible to realize a GLV device having a high light utilization efficiency and a long useful life. Besides, by incorporating such a GLV device in a laser display, it is possible to realize a laser display having a high light utilization efficiency.

The above and other objects, features and advantages of the present invention will become apparent from the following description and appended claims, taken in conjunction with the accompanying drawings which show by way of example some preferred embodiments of the invention.

DETAILED DESCRIPTION OF THE PREFERRED EMBODIMENTS

A mode for carrying out the present invention will be described below concretely and in detail based on embodiments, referring to the accompanying drawings. The film forming method, compositions of layers, film thickness, process conditions and the like shown in the following embodiments are merely an exemplification for easy understanding of the present invention, and the invention is not limited to or by the exemplification.

EMBODIMENT OF MEMS ELEMENT

Figure 1:
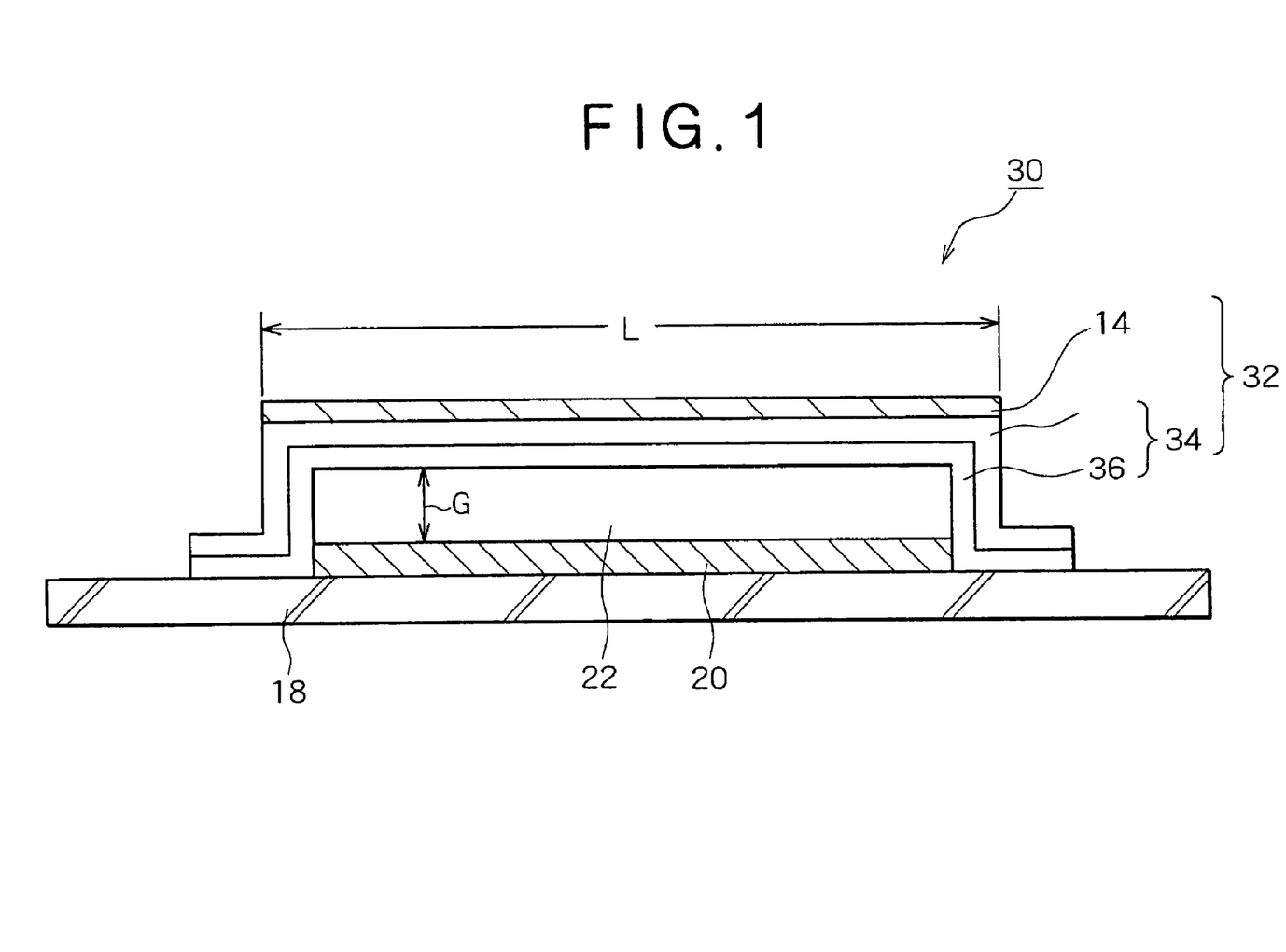
FIG. 1 is a sectional view showing the constitution of a MEMS element according to an embodiment of the present invention.

The present embodiment is one example of embodying the MEMS element according to the present invention, and FIG. 1 is a sectional view showing the constitution of the MEMS element according to the embodiment.

The MEMS element 30 according to this embodiment is constituted as a light modulation element for constituting a GLV device, and it has the same constitution as the conventional MOEMS 12 except for the difference in the structure of a bridge member 34 of a membrane 32.

The gap G of a void layer 22 is, for example, 1 $\mu$m, the length L of the membrane 32 is 100 to 300 $\mu$m, and the width W (See FIG. 6) of the membrane 32 is 2 to 4 $\mu$m.

As shown in FIG. 1, the membrane 32 according to this embodiment comprises a bridge member 34 comprising an $SiO_2$ film 36 of, for example, 20 nm in thickness as a lower layer and an SiN film 38 of, for example, 100 nm in thickness laminated thereon, and a combined light reflective film and membrane-side electrode 14 composed of an Al film of 100 nm in thickness provided on the bridge member 34.

The $SiO_2$ film 36 may be an $SiO_2$ film formed by thermal oxidation of a sacrificing layer composed of polysilicon or may be an $SiO_2$ film formed by a CVD method or a PVD method.

In the MEMS element 30 according to this embodiment, an $SiO_2$ film 36 having a high etching selectivity ratio relative to silicon, namely, having a low etching rate, at the time of dry etching of the sacrificing layer composed of silicon, such as polysilicon and amorphous silicon, by use of $XeF_2$ gas, $SF_6$ gas, $NF_3$ gas or the like as an etching gas is provided as a lower layer of the membrane 32 in contact with the sacrificing layer.

Therefore, in fabricating a GLV device comprising a multiplicity of MOEMS disposed densely and in parallel to each other, the sacrificing layer of the MOEMS can be removed by dry etching without generating the problem that the membranes 32 might be etched and the film thickness thereof might become non-uniform.

Next, referring to FIG. 2, a method of fabricating the MEMS element 30 according to this embodiment will be described. FIGS. 2A to 2E are sectional views according to the sequence of steps for fabricating the MEMS element according to the present embodiment.

Figure 2A:
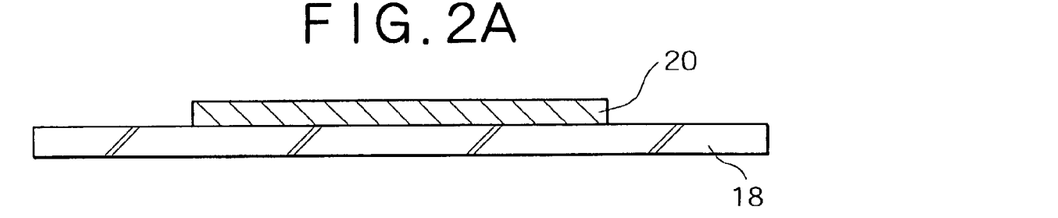
FIGS. 2A to 2E are sectional views according to the sequence of steps for fabricating the MEMS element according to the embodiment.

As shown in FIG. 2A, a metallic film, such as a Cr film, is formed on the entire surface of a substrate 18 and patterned to form a substrate-side electrode 20.

Figure 2B:
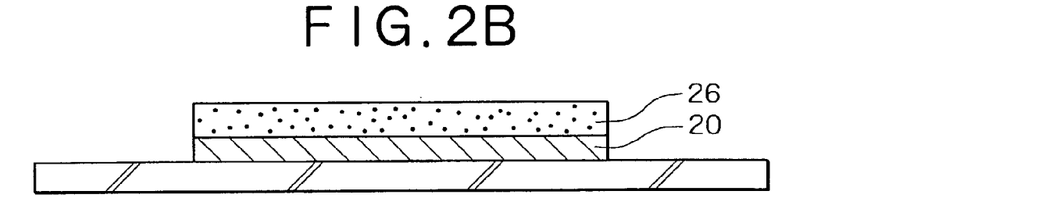

Next, as shown in FIG. 2B, a polysilicon film is formed on the entire surface of the substrate 18 and patterned to form a sacrificing layer 26 on the substrate-side electrode 20.

Figure 2C:
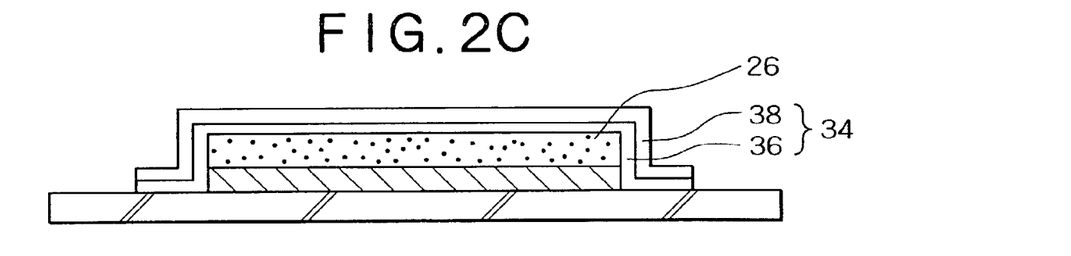

Subsequently, an $SiO_2$ film 36 of, for example, 20 nm in thickness is formed on the entire surface of the substrate 18 by a CVD method or a PVD method, and then an SiN film 38 of, for example, 100 nm in thickness is formed by a CVD method at a temperature of not less than 600° C. and patterned to form a bridge member 34 which is in contact with and astride the sacrificing layer 26 and which is based on the substrate 18, as shown in FIG. 2C.

As a material for forming the $SiO_2$ film by a CVD method, silane ($SiH_4$) or TEOS may be used, without any large difference between the two choices if only controlling the build-up temperature and film stress. The film stress is controlled by varying the ratio between the flow rate of silane or TEOS and the flow rate of $N_2O$ or $O_2$ as an oxidizing agent.

Since the SiN film 38 is formed by a CVD method at a temperature of not less than 600° C., the $SiO_2$ film 36 is formed by a thermal CVD method rather than by a plasma CVD method or a low-temperature normal-pressure CVD method.

Incidentally, from the viewpoint of fabricating a MOEMS with a higher light utilization efficiency, a low-temperature, normal-pressure, CVD method is preferred on the ground that, for example, the surface roughness of the membrane is reduced.

Figure 2D:
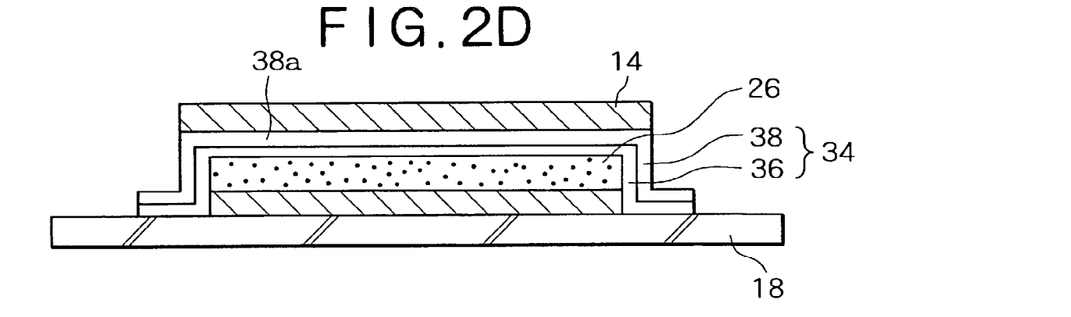

Next, as shown in FIG. 2D, a membrane-side electrode film composed of an Al film is formed on the entire surface of the substrate 18 including the surface of a substrate-side electrode opposed portion 38a of the SiN film 38, and it is patterned to form a membrane-side electrode 14 composed of the Al film on the substrate-side electrode opposed portion 38a of the SiN film 38.

Figure 2E:
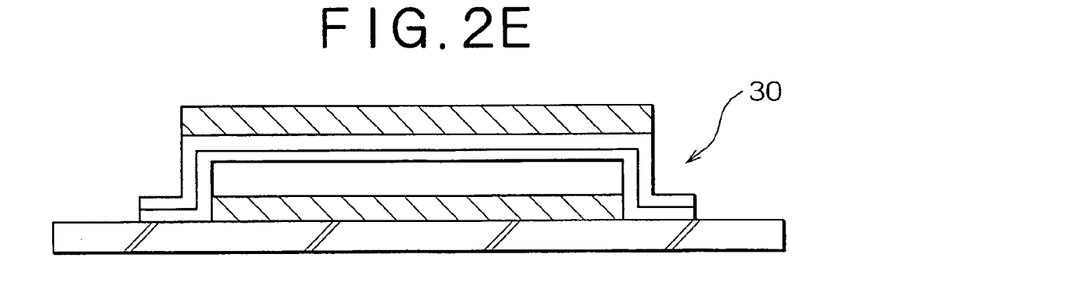

Subsequently, the sacrificing layer 26 composed of the polysilicon film is removed by dry etching using $XeF_2$ gas or by plasma etching using $SF_6$ gas or $NF_3$ gas, to fabricate the MEMS element 30, as shown in FIG. 2E.

In the present embodiment in which the $SiO_2$ film 36 is formed on the sacrificing layer 26 composed of the polysilicon film, the selectivity ratio between the polysilicon film and the $SiO_2$ film at the time of etching the sacrificing layer 26 is high, so that there is no risk that the $SiO_2$ film 36 might be etched and the film thickness of the membrane 32 might become non-uniform.

Therefore, the major problems encountered in the MEMS element according to the prior art can be obviated. Namely, there is no risk that the smoothness of the membrane might be worsened, the light reflectance might be lowered, and the light utilization efficiency of the MOEMS might be worsened. Also, there is no risk that movements by the electrostatic driving of the membrane might be dispersed and predetermined light modulation characteristics might not be displayed. Further, there is no risk that the mechanical strength of the membrane might be dispersed, and the life of the MOEMS and, hence, the life of the GLV device might be shortened.

While the $SiO_2$ film 36 is formed by a CVD method or a PVD method in the method of fabricating the MEMS element 30 described above, the method is not limitative, and the $SiO_2$ film may be formed by thermal oxidation of the polysilicon film constituting the sacrificing layer 26. It should be noted, however, that in the formation of the thermal oxide film, roughness is generated at the surface of the $SiO_2$ film according to the progress of crystallization in the silicon material and, as a result, the smoothness of the membrane 32 may be lower and the light utilization efficiency of the light modulation element may be lower, as compared with the case of the $SiO_2$ film formed by a CVD method or a PVD method.

In the membrane 32 of the MEMS element 30 according to this embodiment, use of a titanium oxide ($TiO_2$) film or a zirconium oxide ($ZrO_2$) film in place of the $SiO_2$ film leads to the same effect as the $SiO_2$ film.

Figure 3:
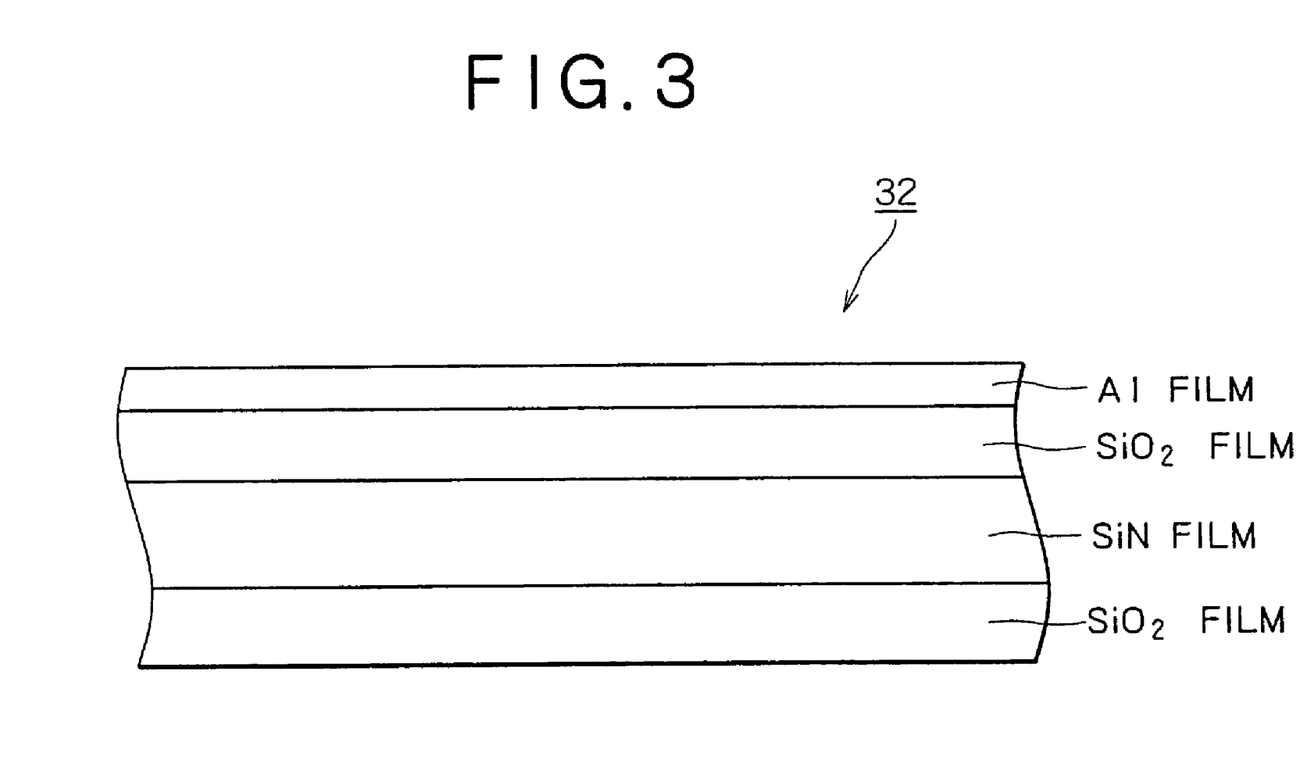
FIG. 3 is a sectional view showing the constitution of a membrane having a four-layer structure.

Furthermore, while the membrane 32 has a three-layer structure of Al/SiN/$SiO_2$ in this embodiment, the membrane 32 may be provided with a four-layer structure comprising a further layer, for example, an $SiO_2$ film, between the Al film and the SiN film, as shown in FIG. 3, for easier control of the elastic force of the membrane 32.

With the $SiO_2$ film thus provided intermediately between the Al film and the SiN film, the adhesive force between the SiN film and the Al film can be enhanced, and generation of electrical problems, such as generation of an interface state, can be restrained.

EMBODIMENT OF GLV DEVICE

A GLV device in the present embodiment is an example of embodying the GLV device according to the present invention, in which the MEMS elements 30 are used in place of the MEMS elements 12 used in the GLV device 10 according to the prior art described above.

The GLV device according to this embodiment is constituted as a light modulator for modulating the intensity of reflected light by controlling the inclination of the combined light reflective film and membrane-side electrode 14 of each MEMS element 30 through driving the light reflective film 14 by an electrostatic attracting force or an electrostatic repulsion force acting between the combined light reflective film and membrane-side electrode 14 and the substrate-side electrode 20.

EMBODIMENT OF LASER DISPLAY

Figure 4:
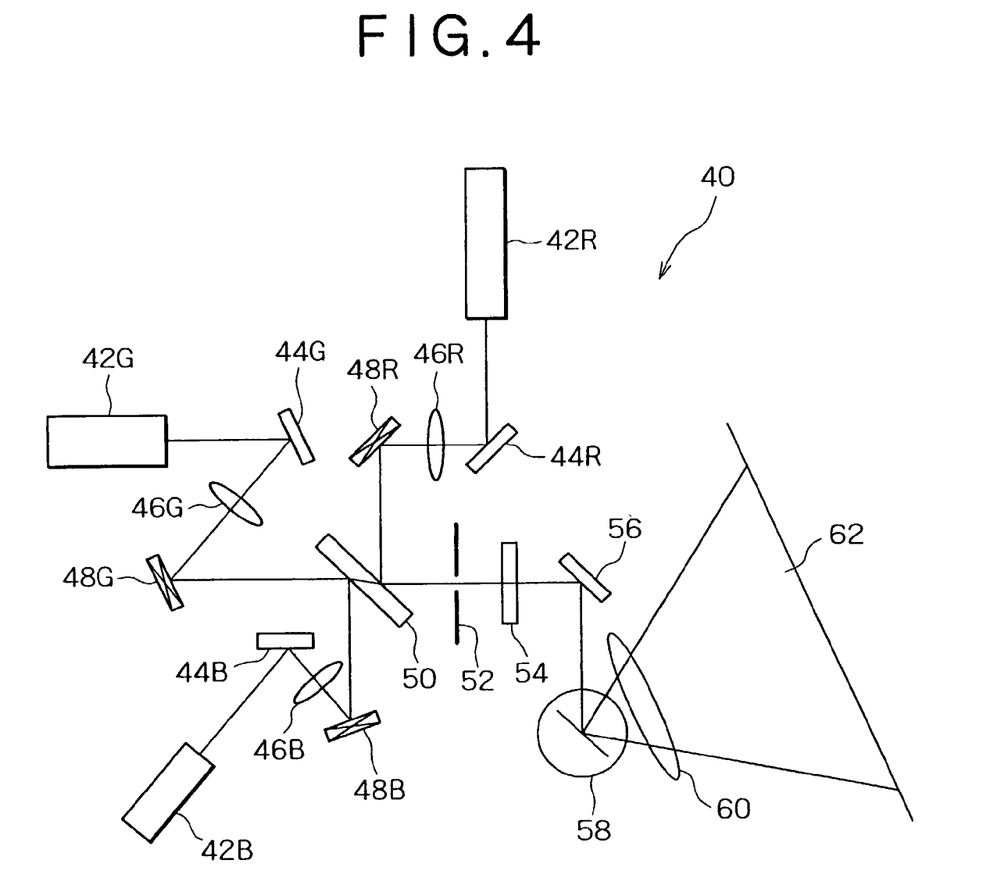
FIG. 4 is a schematic diagram showing the constitution of a laser display according to an embodiment of the present invention.

The present embodiment is an example of embodying the laser display according to the present invention; and FIG. 4 is a schematic diagram showing the constitution of the laser display according to this embodiment.

The laser display 40 of this embodiment is an optical apparatus using the GLV devices according to the above-described embodiment and is used, for example, as a large-type screen projector, particularly a digital picture projector, or as a computer picture projector.

As shown in FIG. 4, the laser display 40 comprises lasers 42R, 42G, 42B provided as laser light sources of red (R), green (G), blue (B) in color, and mirrors 44R, 44G, 44B, illumination optical systems 46R, 46G, 46B, and GLV devices 48R, 48G, 48B functioning as light modulators, which are sequentially disposed respectively on optical axes of the light sources.

As the lasers 42R, 42G and 42B, lasers of R (wavelength: 642 nm; light output: about 3 W), G (wavelength: 532 nm; light output: about 2 W) and B (wavelength: 457 nm; light output: about 1.5 W) are used.

Further, the laser display 40 comprises a color combination filter 50 for combining the red (R) laser light, green (G) laser light and blue (B) laser light modulated in light intensity respectively by the GLV devices 48R, 48G and 48B, a space filter 52, a diffuser 54, a mirror 56, a Galvano-scanner 58, a projection optical system 60, and a screen 62.

The color combination filter 50 is composed, for example, of a dichroic mirror.

In the laser display 40 according to the present embodiment, the R, G, B laser lights emitted from the lasers 42R, 42G, 42B are transmitted through the mirrors 44R, 44G, 44B and the illumination optical systems 46R, 46G, 46B to be incident on the GLV devices 48R, 48G, 48B, respectively. The laser lights are picture signals that are classified in color and synchronously inputted to the GLV devices 48R, 48G, 48B.

Furthermore, the laser lights are space modulated by being diffracted by the GLV devices 48R, 48G, 48B, these three color diffracted lights are combined by the color combination filter 50, and then only a signal component is picked up by the space filter 52.

Next, the RGB picture signal is treated by the diffuser 54 to reduce laser speckles, reflected by the mirror 56, developed into space by the Galvano-scanner 58 synchronized with the picture signal, and projected as a full-color picture on the screen 62 by the projection optical system 60.

In the laser display 40, the GLV devices 48 having the same structure for all of RGB are used, whereby the luminous flux of the picture signal emitted is about 310 lumen. In a laser display having the same structure as the laser display 40 of this embodiment, except for using conventional light modulation elements, the luminous flux of the signal is about 300 lumen. It is seen, therefore, that in the laser display 40 according to this embodiment, the utilization efficiency of the light sources is enhanced.

Besides, when GLV devices 48 optimized for respective wavelengths of RGB are used, the luminous flux of the signal is further enhanced to about 320 lumen.

While the GLV devices 48R, 48G, 48B are provided correspondingly to the lasers 42 for respective colors in the laser display 40 of this embodiment, the GLV devices also can be applied to various displays having other constitutions. For example, a structure may be adopted in which the light source is white light, and light modulation elements 48R, 48G, 48B differing in membrane width constitute a single pixel so that only the light components with respective wavelengths of RGB are reflected (the other light components are diffracted) to display respective colors.

In addition, a structure is possible in which white light emitted from a single light source is transmitted through color wheels synchronized with picture information consisting of RGB picture data, to be incident on the GLV devices 48.

Furthermore, for example, where a single light modulation element 48 is used and lights from RGB LEDs (light emitting diodes) are diffracted so as to reproduce color information for individual pixels, a simple, handy-type color display is realized.

Besides, the GLV device according to the present invention can be used not only for projectors such as the laser display of the present embodiment but also for various devices for WDM (Wavelength Division Multiplexing) transmission in optical communication, MUX (Multiplexer), DEMUX (Demultiplexer), or light switches such as OADM (Optical Add/Drop Multiplexer) and OXC (Optical Cross Connect)

Furthermore, the GLV device according to the present invention also can be applied to other optical apparatuses, for example, a micro drawing apparatus capable of directly drawing a digital picture or the like, a semiconductor exposure apparatus, a printer engine, or the like.

Besides, while a laser display in which space modulation is conducted by use of the GLV devices 48R, 48G, 48B has been described as the laser display device 40 in the present embodiment, the GLV device according to the present invention can perform switching of information capable of being modulated by interference and diffraction, such as phase and light intensity, and can therefore be applied to optical apparatuses utilizing this property.

What is claimed is:

1. A micro electromechanical system element that functions as a light modulation element for modulating the intensity of reflected light by driving a membrane-side electrode through an electrostatic attracting force or an electrostatic repulsion force acting between the membrane-side electrode and a substrate-side electrode, the micro electro-mechanical system element comprising:

a substrate; the substrate-side electrode; a bridge member; and the membrane-side electrode, wherein:

said bridge member includes a nitride film and an oxide film, said oxide film being between said substrate and said nitride film, a first portion of said bridge member is between said membrane-side electrode and a void, said substrate-side electrode is between said void and a first portion of said substrate, and a second portion of said bridge member is in contact with a second portion of said substrate.

2. A micro electromechanical system element as set forth in claim 1, wherein:

said bridge member includes another oxide film, said nitride film being between said oxide film and said another oxide film.

3. A micro electromechanical system element as set forth in claim 1, wherein:

said substrate is an insulating substrate, said membrane-side electrode is a light-reflective metallic film, said nitride film is an SiN film, and said oxide film is any of a silicon oxide ($SiO_2$) film, a titanium oxide ($TiO_2$) film, and a zirconium oxide ($ZrO_2$) film.

4. A grating light valve device comprising:

a plurality of micro electromechanical system elements constituted respectively as light modulation elements and disposed in parallel to each other, wherein:

each of said micro electromechanical system elements comprises the micro electro-mechanical system element of claim 1.

* * * * *